US012672100B2

(12) United States Patent
Lou et al.

(10) Patent No.: US 12,672,100 B2
(45) Date of Patent: Jun. 30, 2026

(54) SYSTEMS AND METHODS FOR IMPROVING POSITIONING WITH ERROR SOURCE MODELING

(71) Applicant: ZTE CORPORATION, Shenzhen (CN)

(72) Inventors: Junpeng Lou, Shenzhen (CN); Chuangxin Jiang, Shenzhen (CN); Di Zong, Shenzhen (CN); Yu Pan, Shenzhen (CN); Qi Yang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 108 days.

(21) Appl. No.: 18/816,629

(22) Filed: Aug. 27, 2024

(65) Prior Publication Data

US 2026/0067860 A1     Mar. 5, 2026

Related U.S. Application Data

(63) Continuation of application No. PCT/CN2023/087131, filed on Apr. 7, 2023.

(51) Int. Cl.
| | |
|---|---|
| *H04W 24/00* | (2009.01) |
| *H04W 56/00* | (2009.01) |
| *H04W 64/00* | (2009.01) |

(52) U.S. Cl.
CPC ....... *H04W 64/006* (2013.01); *H04W 56/001* (2013.01); *H04W 56/006* (2013.01)

(58) Field of Classification Search
CPC ............. H04W 64/006; H04W 56/001; H04W 56/006; H04W 4/00; H04W 99/00

USPC ....................................................... 455/456.1
See application file for complete search history.

(56) References Cited

U.S. PATENT DOCUMENTS

| | | | | |
|---|---|---|---|---|
| 8,818,399 | B2 * | 8/2014 | Siomina | H04W 56/006 |
| | | | | 455/456.2 |
| 9,661,508 | B2 * | 5/2017 | Siomina | H04B 17/318 |
| 9,986,373 | B2 * | 5/2018 | Davydov | G01S 19/05 |
| 11,844,146 | B2 * | 12/2023 | Cui | H04W 64/00 |

(Continued)

FOREIGN PATENT DOCUMENTS

| | | |
|---|---|---|
| CN | 115804168 A | 3/2023 |
| WO | WO-2021/029960 A | 2/2021 |

(Continued)

OTHER PUBLICATIONS

Notice of Reasons for Rejection for JP Appl. No. 2024-552196, dated Aug. 29, 2025 (with English translation, 7 pages).

(Continued)

*Primary Examiner* — Marceau Milord
(74) *Attorney, Agent, or Firm* — Foley & Lardner LLP

(57) ABSTRACT

Presented are systems and methods for positioning. A method includes sending, by a core network entity to a first wireless communication entity, a first message including measurement and/or assistance data for positioning, wherein the assistance data includes no or one or more characteristic parameters associated with a model of an error source. Another method includes receiving, by a core network entity from a second wireless communication entity, a second message including assistance data for positioning, wherein the assistance data includes one or more characteristic parameters associated with a model of an error source.

16 Claims, 14 Drawing Sheets

1300

Receive, by a core network entity from a first or second wireless communication entity, a message including assistance data for positioning, wherein the assistance data includes one or more characteristic parameters associated with a model of an error source

(56) References Cited

U.S. PATENT DOCUMENTS

| | | | | |
|---|---|---|---|---|
| 2011/0207477 A1* | 8/2011 | Siomina | H04W 56/006 | 455/67.11 |
| 2013/0072123 A1* | 3/2013 | Garavaglia | H04W 24/10 | 455/63.1 |
| 2013/0301451 A1* | 11/2013 | Siomina | H04B 17/318 | 370/252 |
| 2015/0043518 A1* | 2/2015 | Garavaglia | H04L 1/003 | 370/329 |
| 2016/0165561 A1* | 6/2016 | Lee | H04W 4/80 | 370/350 |
| 2016/0205499 A1* | 7/2016 | Davydov | G01S 5/0236 | 455/456.1 |
| 2021/0051623 A1* | 2/2021 | Manolakos | G01S 5/0236 | |
| 2022/0034992 A1* | 2/2022 | Kuo | H04W 4/029 | |
| 2022/0086624 A1* | 3/2022 | Cui | H04W 16/14 | |
| 2022/0116906 A1* | 4/2022 | Gummadi | G01S 5/0205 | |
| 2022/0232345 A1* | 7/2022 | Bao | H04W 4/023 | |
| 2022/0248366 A1* | 8/2022 | Bao | H04W 64/006 | |
| 2023/0080149 A1 | 3/2023 | Liu et al. | | |
| 2023/0180171 A1* | 6/2023 | Modarres Razavi | H04W 88/02 | 455/456.1 |
| 2024/0073854 A1* | 2/2024 | Rao | G01S 5/0036 | |
| 2024/0179781 A1* | 5/2024 | Pu | H04W 52/52 | |

FOREIGN PATENT DOCUMENTS

| | | | |
|---|---|---|---|
| WO | WO-2021/198983 A1 | 10/2021 | |
| WO | WO-2022/154736 A1 | 7/2022 | |

OTHER PUBLICATIONS

Office Action for CA Appl. No. 3,254,191 dated Nov. 10, 2025 (6 pages).
Zte, "Discussion on integrity of RAT dependent positioning", 3GPP TSG RAN WG1 #111, R1-2211502, Nov. 18, 2022, Toulouse, France (15 pages).
Examination Report No. 1 for AU Appl. No. 2023405444, dated Mar. 28, 2025 (3 pages).
Notice of Acceptance of Patent Application for AU Appl. No. 2023405444, dated Jun. 4, 2025 (3 pages).
3GPP,"3 Generation Partnership Project; Technical Specification Group Radio Access Network; LTE Positioning Protocol (LPP) (Release 17)", 3GPP Standard; Technical Specification; 3GPP TS 37.355, No. V17.4.0, Mar. 31, 2023 (350 pages).
Extended European Search Report for EP Appl. No. 23895791.4 dated Apr. 28, 2025 (8 pages).
Lianhai Wu et al: "Discussion on RAT-dependent integrity", 3GPP Draft; R2-2300960; vol. RAN WG2, Athens, GR; Feb. 27, 2023-Mar. 3, 2023, Feb. 17, 2023 (5 pages).
Ericsson, "Signaling for LMF-based RAT-dependent positioning Integrity", 3GPP TSG-RAN WG2 #121, R2-2301307, Feb. 17, 2023, Athens Greece (14 pages).
International Search Report and Written Opinion on PCT/CN2023/087131 mailed Nov. 22, 2023 (6 pages).
Zte Corporation, "Discussion on RAT-dependent methods positioning integrity", 3GPP TSG RAN WG2 #120, R2-2212684, Nov. 4, 2022, Toulouse France (9 pages).
Zte Corporation, "Discussion on RAT-dependent methods positioning integrity", 3GPP TSG RAN WG2 #121, R2-2300930, Feb. 17, 2023, Athens Greece (9 Pages).
Notice of Final Rejection for JP Appl. No. 2024-552196, dated Feb. 27, 2026 (with English translation, 6 pages).

* cited by examiner

Figure 12:
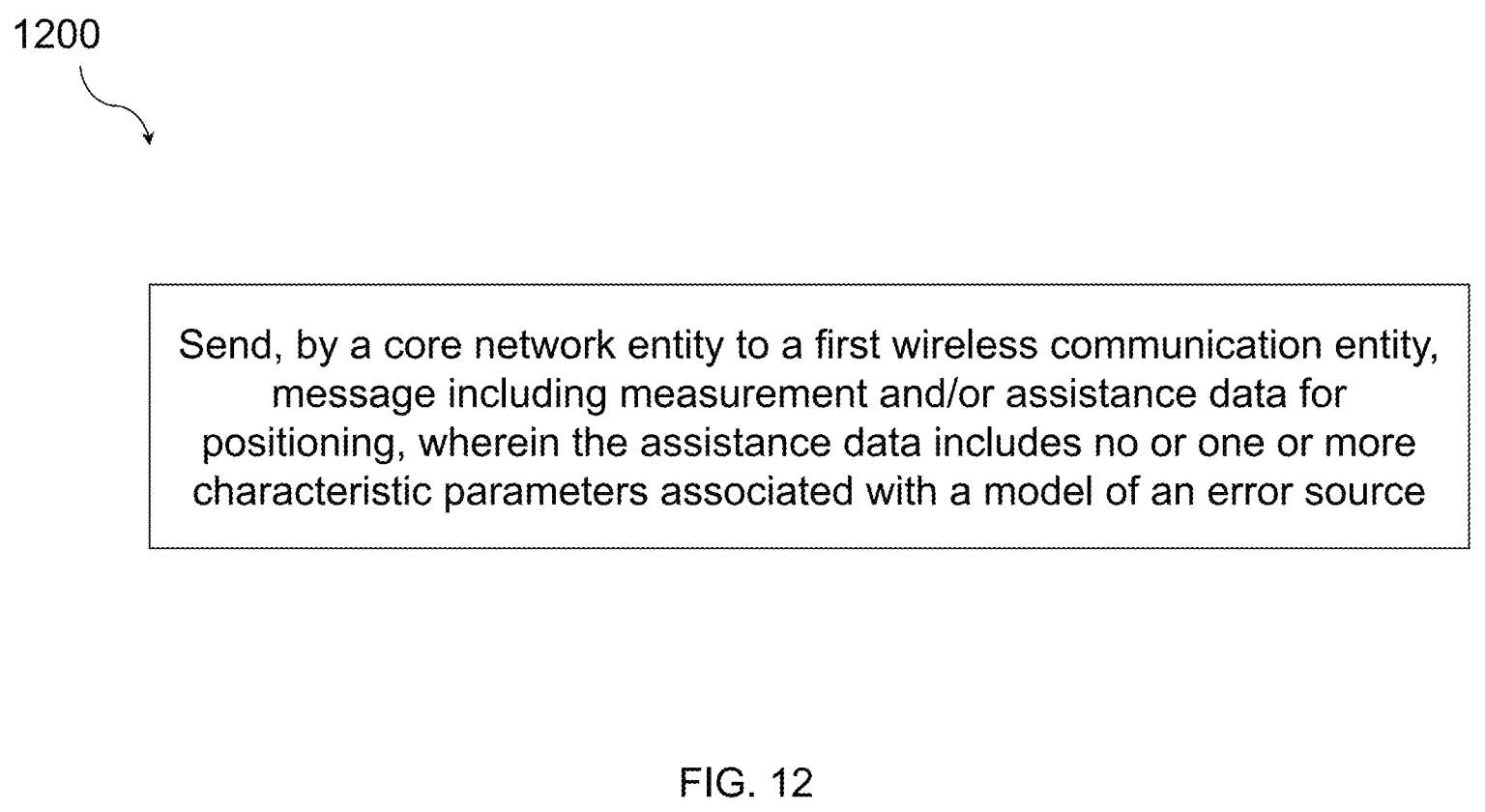

1200

Send, by a core network entity to a first wireless communication entity, message including measurement and/or assistance data for positioning, wherein the assistance data includes no or one or more characteristic parameters associated with a model of an error source

Figure 13:
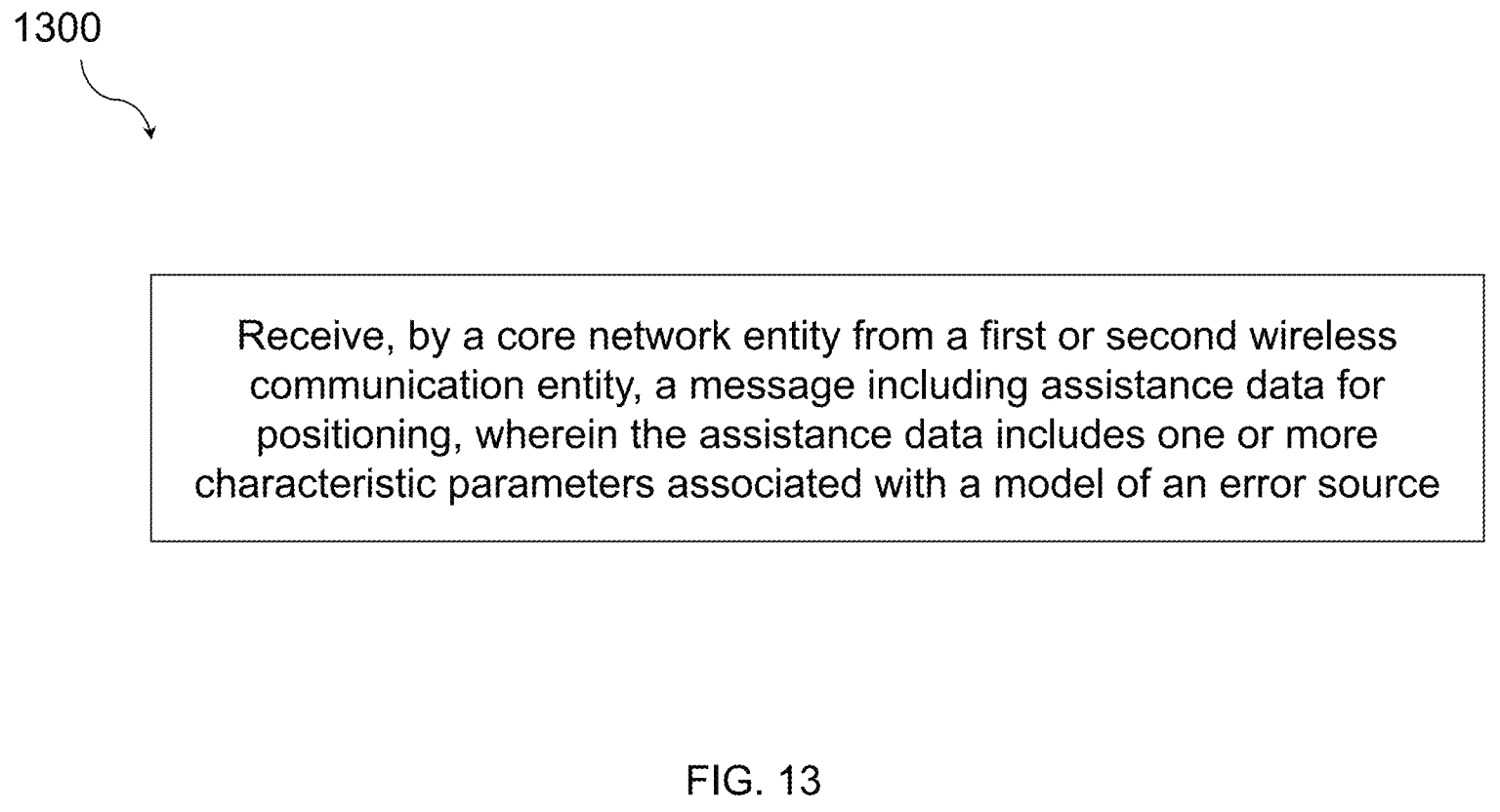

Receive, by a core network entity from a first or second wireless communication entity, a message including assistance data for positioning, wherein the assistance data includes one or more characteristic parameters associated with a model of an error source

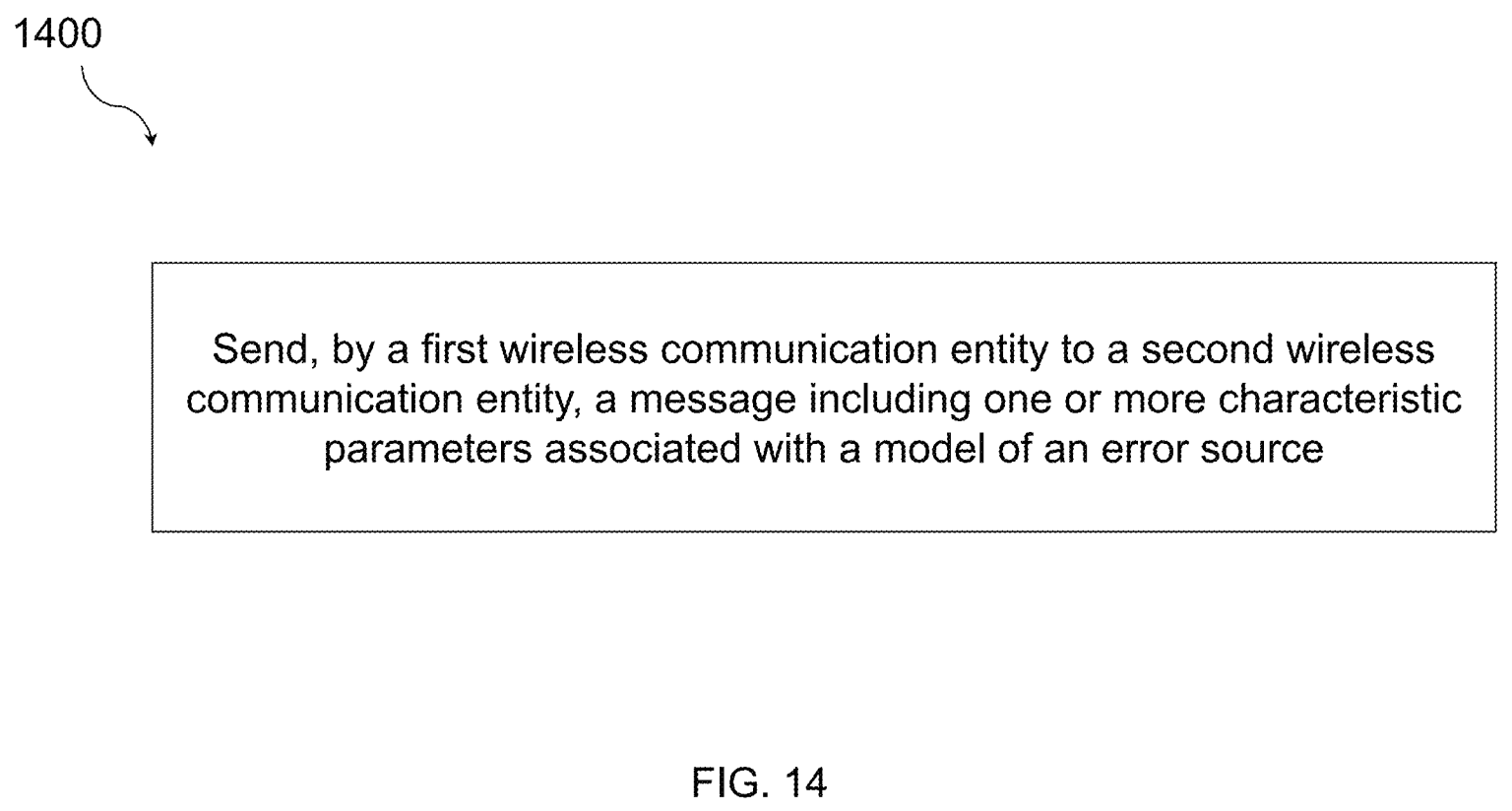

Send, by a first wireless communication entity to a second wireless communication entity, a message including one or more characteristic parameters associated with a model of an error source

FIG. 14

SYSTEMS AND METHODS FOR IMPROVING POSITIONING WITH ERROR SOURCE MODELING

CROSS-REFERENCE TO RELATED APPLICATION

This application claims the benefit of priority under 35 U.S.C. § 120 as a continuation of International Patent Application No. PCT/CN2023/087131, filed on Apr. 7, 2023, the disclosure of which is incorporated herein by reference in its entirety.

TECHNICAL FIELD

The disclosure relates generally to wireless communications, including but not limited to systems and methods for positioning.

BACKGROUND

Positioning Integrity is a measure of the trust in the accuracy of position-related data provided by a positioning system and the ability to provide timely and valid warnings to the location services (LCS) client when the positioning system does not meet one or more conditions for proper operation.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

At least one aspect is directed to a system, method, apparatus, or a computer-readable medium of the following. The method includes sending, by a core network entity to a first wireless communication entity, a first message including measurement and/or assistance data for positioning, wherein the assistance data includes no or one or more characteristic parameters associated with a model of an error source.

At least another aspect is directed to a system, method, apparatus, or a computer-readable medium of the following. The method includes receiving, by a core network entity from a first or second wireless communication entity, a second message including assistance data for positioning, wherein the assistance data includes one or more characteristic parameters associated with a model of an error source.

At least yet another aspect is directed to a system, method, apparatus, or a computer-readable medium of the following. The method includes sending, by a first wireless communication entity to a second first wireless communication entity, a message including one or more characteristic parameters associated with a model of an error source.

In this disclosure, the first wireless communication entity can be a UE, a TRP, a NG-RAN node, a gNB, or any of various other wireless communication entities. The core network entity can be an LMF or any of various other core network entities. The second wireless communication entity can be a UE, a TRP, a NG-RAN node, a gNB, or any of various other wireless communication entities.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIG. 12 illustrates a flow diagram of an example method for positioning, in accordance with an embodiment of the present disclosure.

FIG. 13 illustrates a flow diagram of another example method for positioning, in accordance with an embodiment of the present disclosure.

FIG. 14 illustrates a flow diagram of yet another example method for positioning, in accordance with an embodiment of the present disclosure.

DETAILED DESCRIPTION

Mobile Communication Technology and Environment

Figure 1:
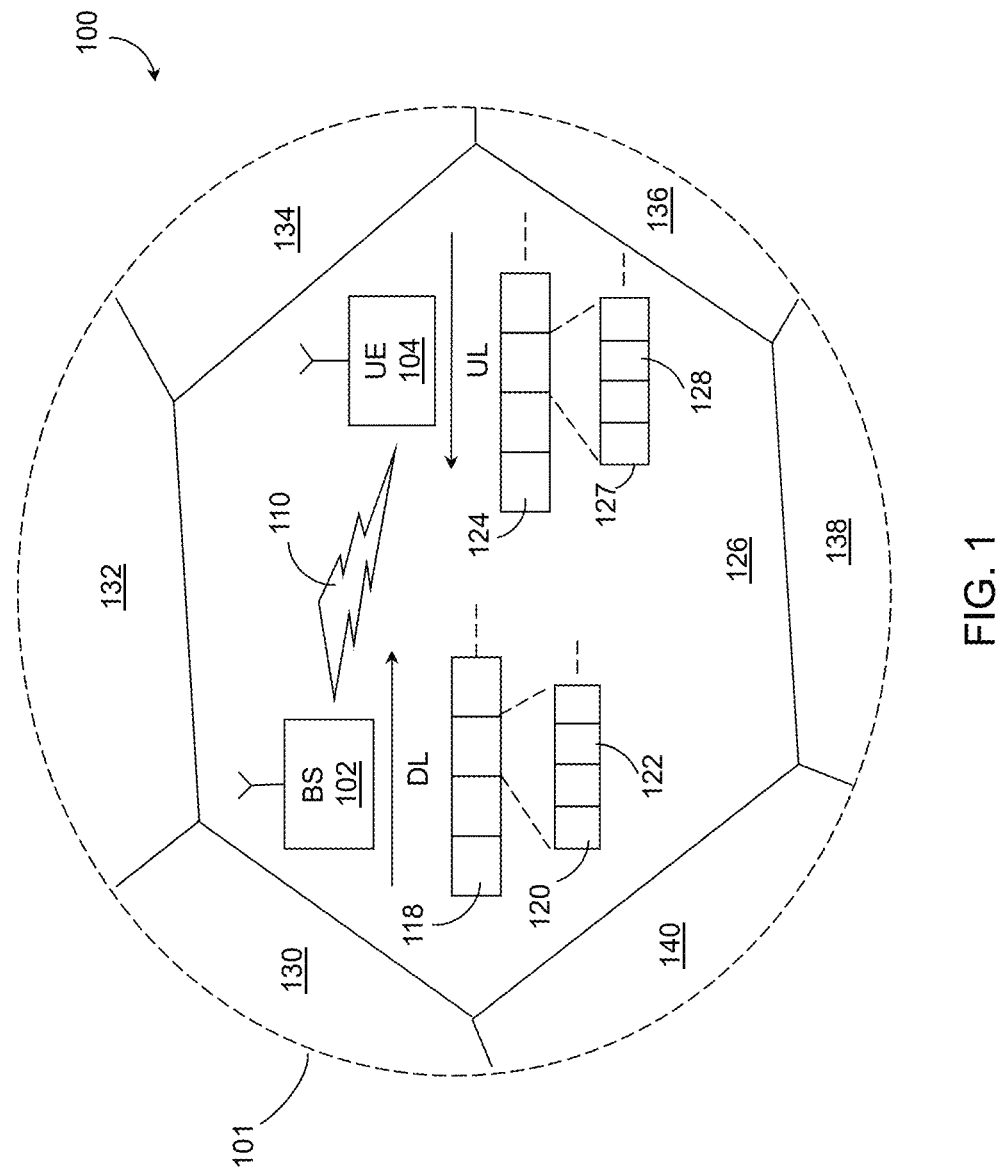
FIG. 1 illustrates an example cellular communication network in which techniques disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
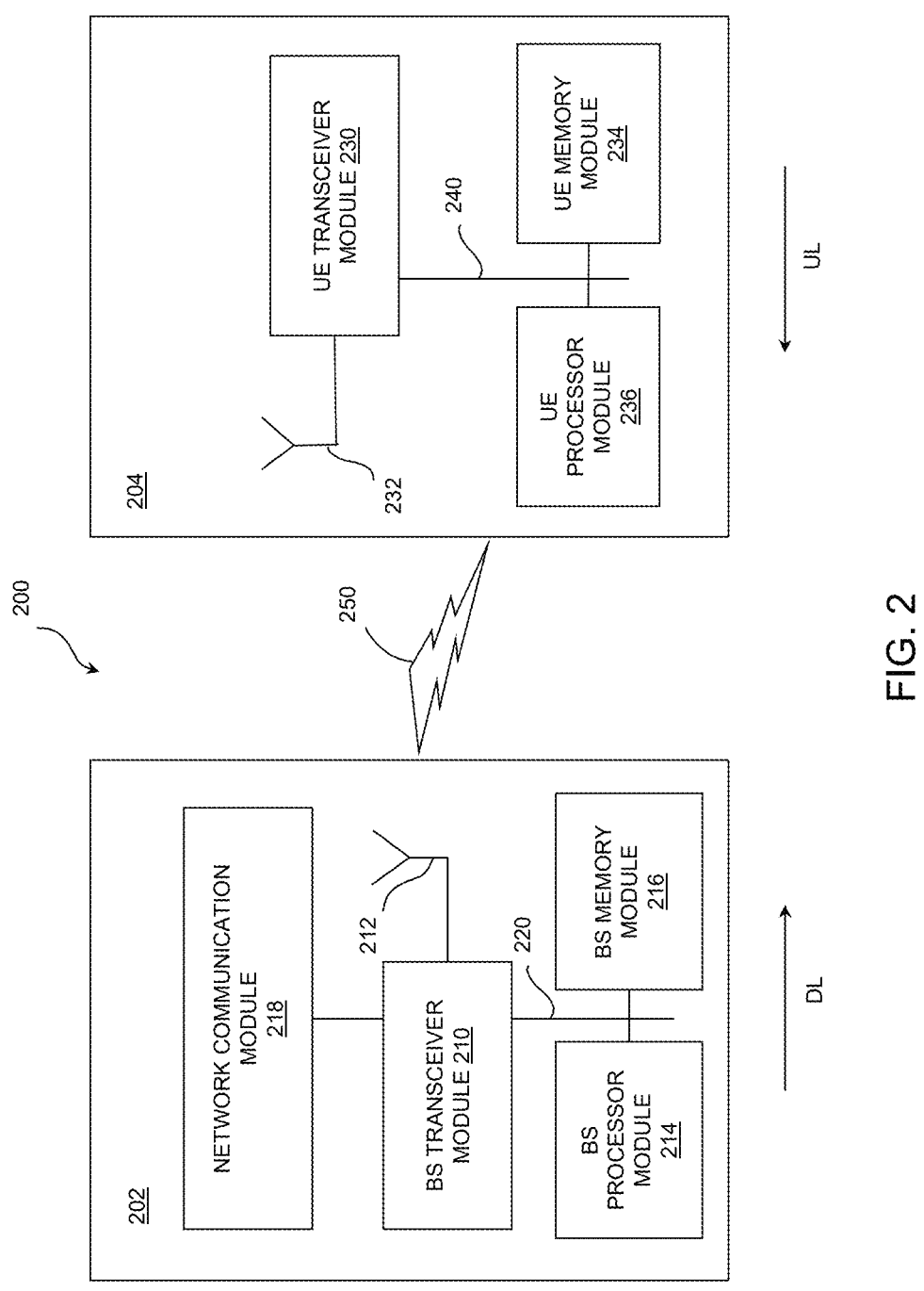
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, a pico station, a next generation node B (gNB), a Transmission and Reception Point (TRP), for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

Systems and Methods for Positioning

This disclosure relates to systems and methods for improving the accuracy of integrity determination. For example, the systems and methods, as disclosed herein, provide a Radio Access Technology (RAT)-dependent positioning method and an RAT-independent (e.g. Sidelink, Bluetooth, and so on) positioning method, each of which is associated with an error source modeling and one or more characteristic parameters that can help define the model of such error sources. With the help of the modeling of this error source, the integrity and reliability of existing positioning methods can be significantly improved.

Figure 3:
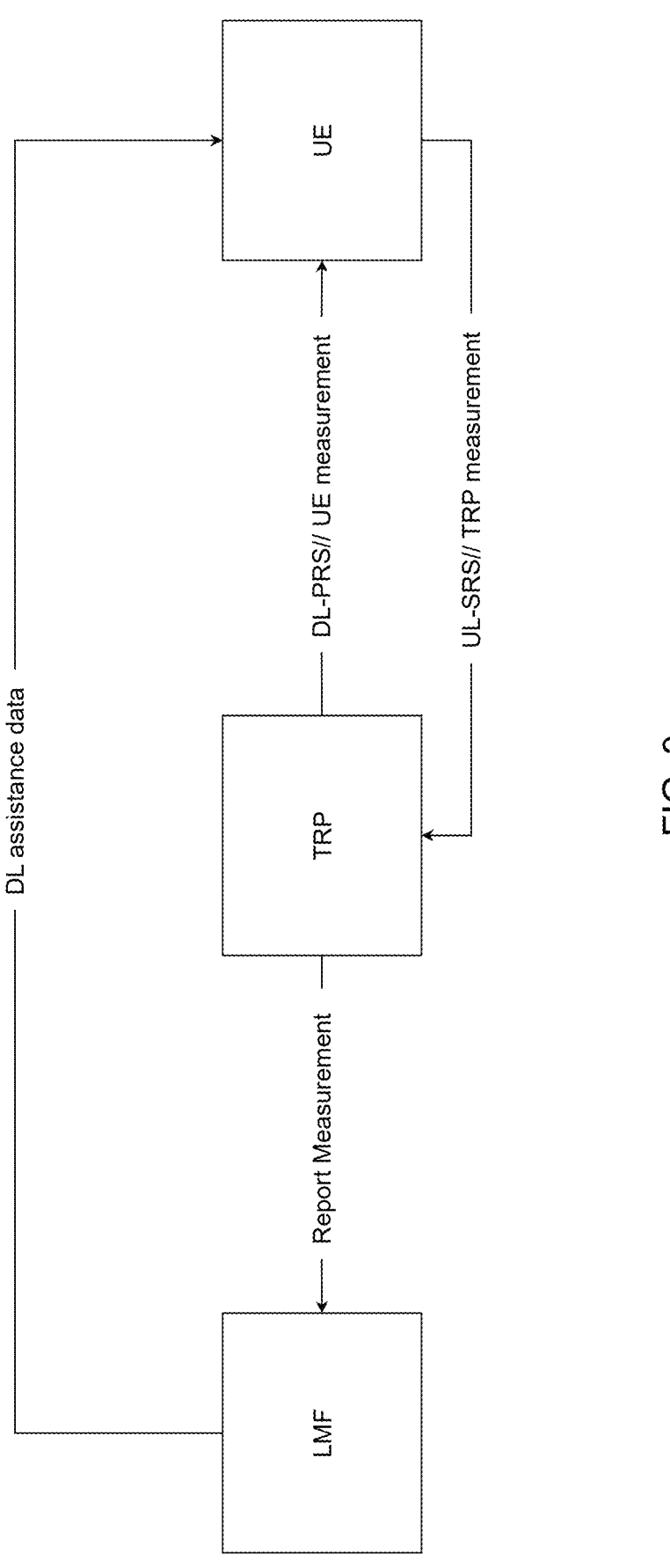
FIG. 3 illustrates a schematic diagram of a scenario where the currently disclosed error source modeling can help to improve the reliability and integrity, in accordance with some embodiments of the present disclosure.
Figure 4:
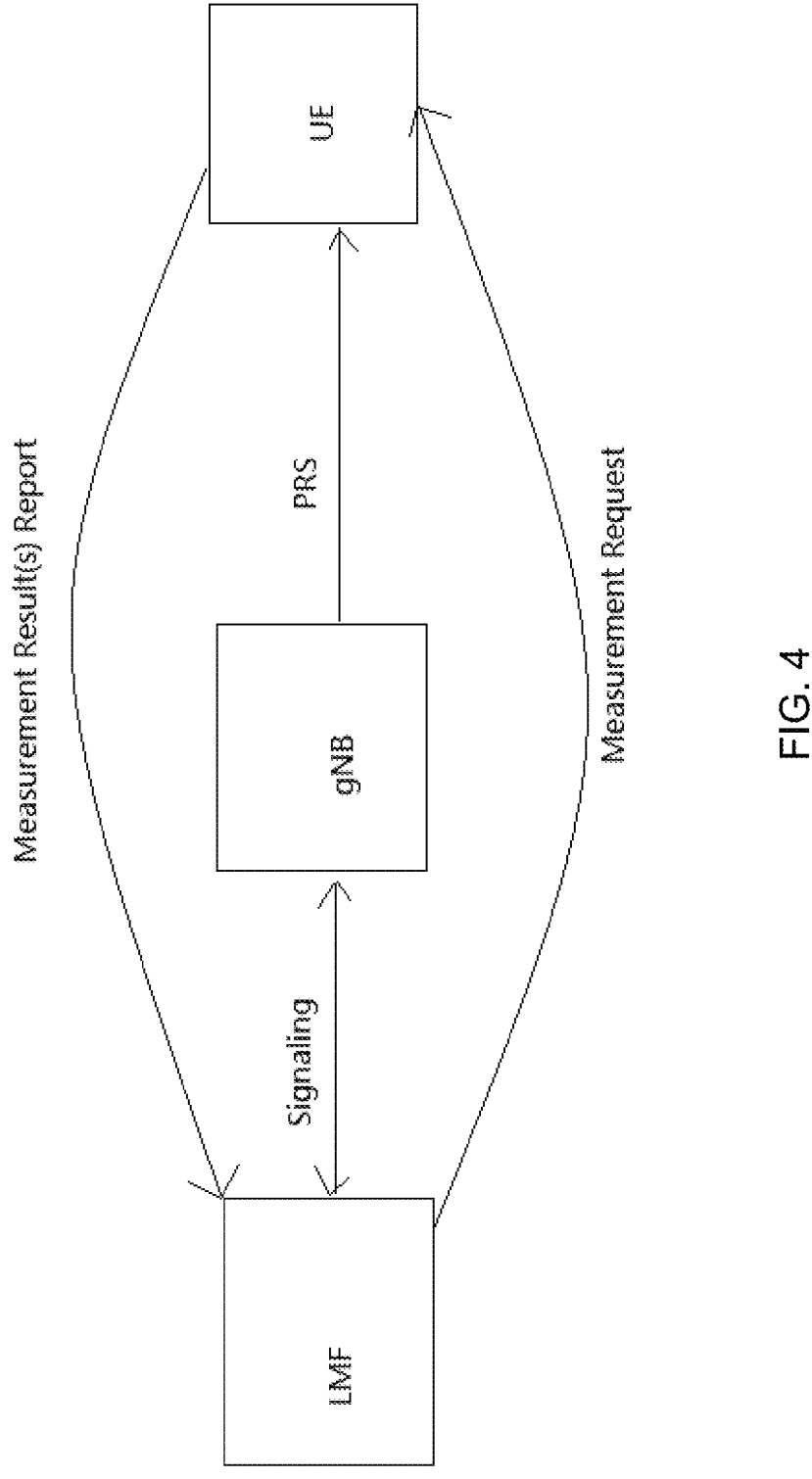
FIG. 4 illustrates a schematic diagram of another scenario where the currently disclosed error source modeling can help to improve the reliability and integrity, in accordance with some embodiments of the present disclosure.
Figure 5:
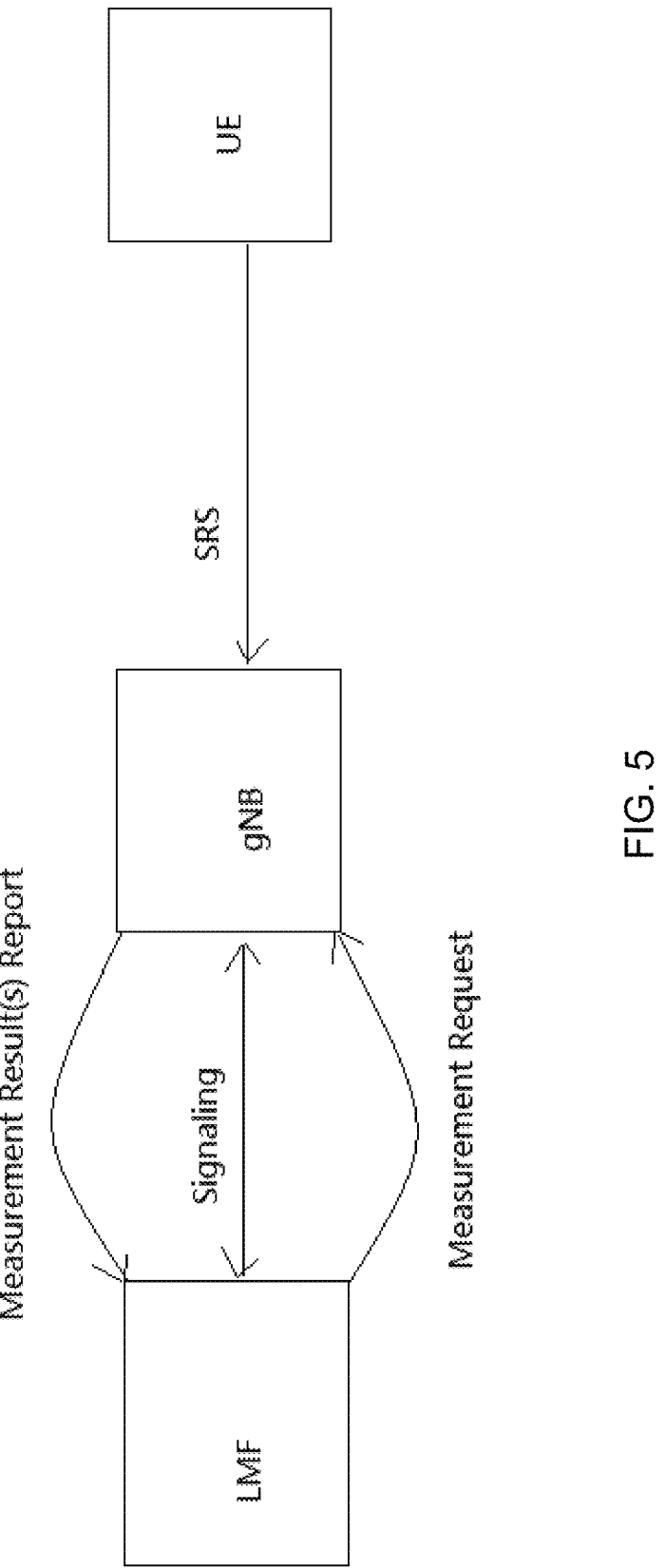
FIG. 5 illustrates a schematic diagram of yet another scenario where the currently disclosed error source modeling can help to improve the reliability and integrity, in accordance with some embodiments of the present disclosure.

FIG. 3 illustrates a schematic diagram of a scenario where the currently disclosed error source modeling can help to improve the reliability and integrity. For example in FIG. 3, the error source modeling may be sent from a core network entity (e.g., a LMF) to a UE as assistance data. The UE may use such assistance data for performing positioning, which is sometimes referred to as UE-based positioning. FIG. 4 illustrates a schematic diagram of another scenario where the currently disclosed error source modeling can help to improve the reliability and integrity. For example in FIG. 4, the error source modeling may be sent from a UE to an LMF as assistance data. The LMF may use such assistance fate for performing positioning, which is sometimes referred to as one type of LMF-based positioning. FIG. 5 illustrates a schematic diagram of yet another scenario where the currently disclosed error source modeling can help to improve the reliability and integrity. For example in FIG. 5, the error source modeling may be sent from a base station (e.g., a TRP) to an LMF as assistance data. The LMF may use such assistance fate for performing positioning, which is sometimes referred to as another type of LMF-based positioning.

In various embodiments, the error sources may include assistance data error sources or measurement sources such as, for example, Timing measurement errors, Inter-TRP synchronization errors, angle measurement errors, DL-PRS RSRPP of the first path or RSRP and other error sources. The error source, or more specifically, one or more characteristic parameters of a model for such an error source can be sent as a portion of a message from one wireless communication entity to another wireless communication entity. As illustrated in FIGS. 3-5, such characteristic parameters can be sent from an LMF to a UE, from a TRP to an LMF, or from a UE to an LMF.

Embodiment 1

Figure 6:
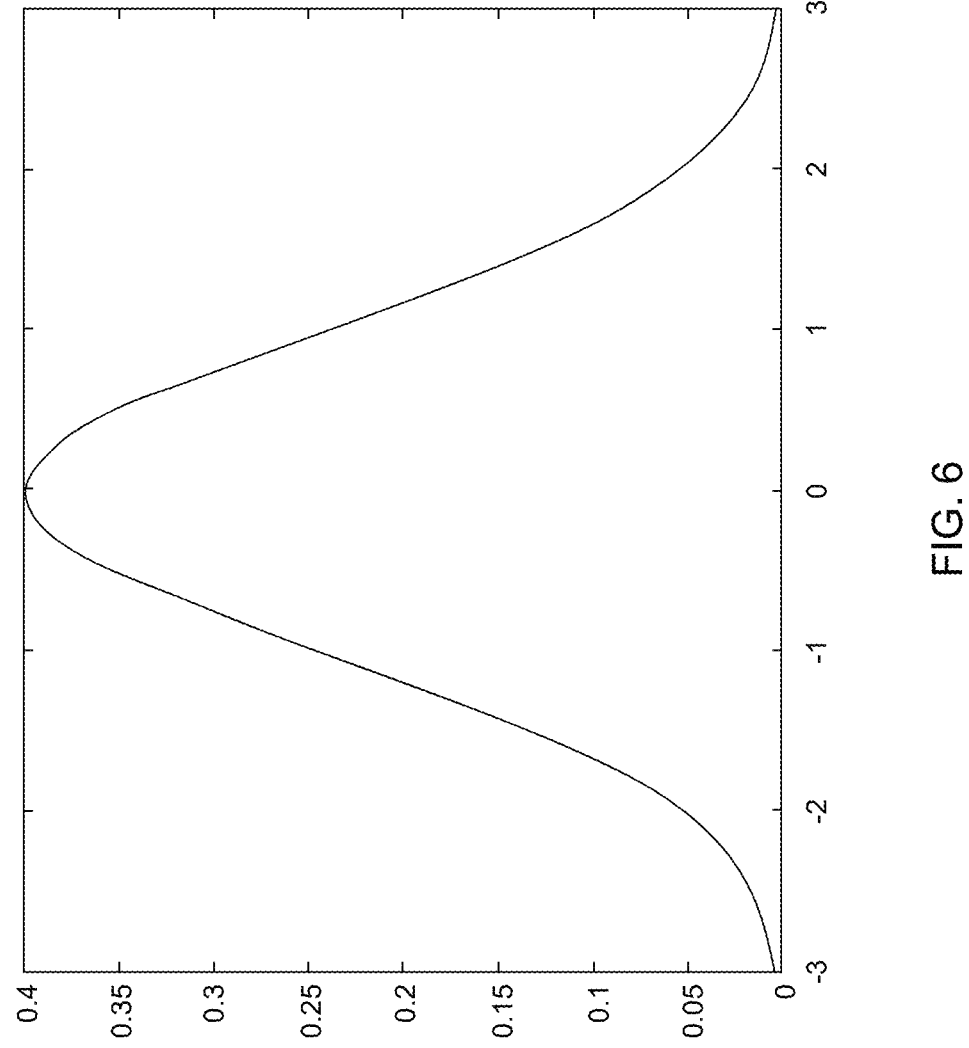
FIGS. 6-11 illustrate various examples of models of an error source, in accordance with some embodiments of the present disclosure.
Figure 7:
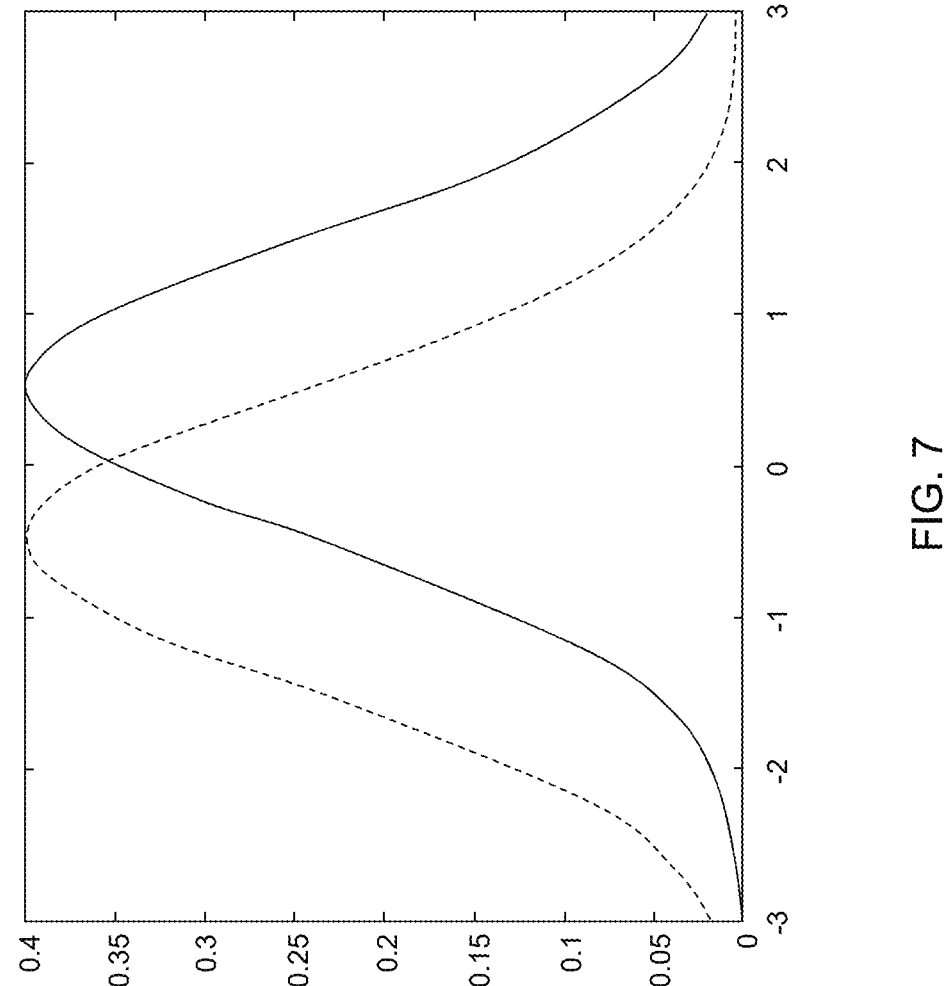
Figure 8:
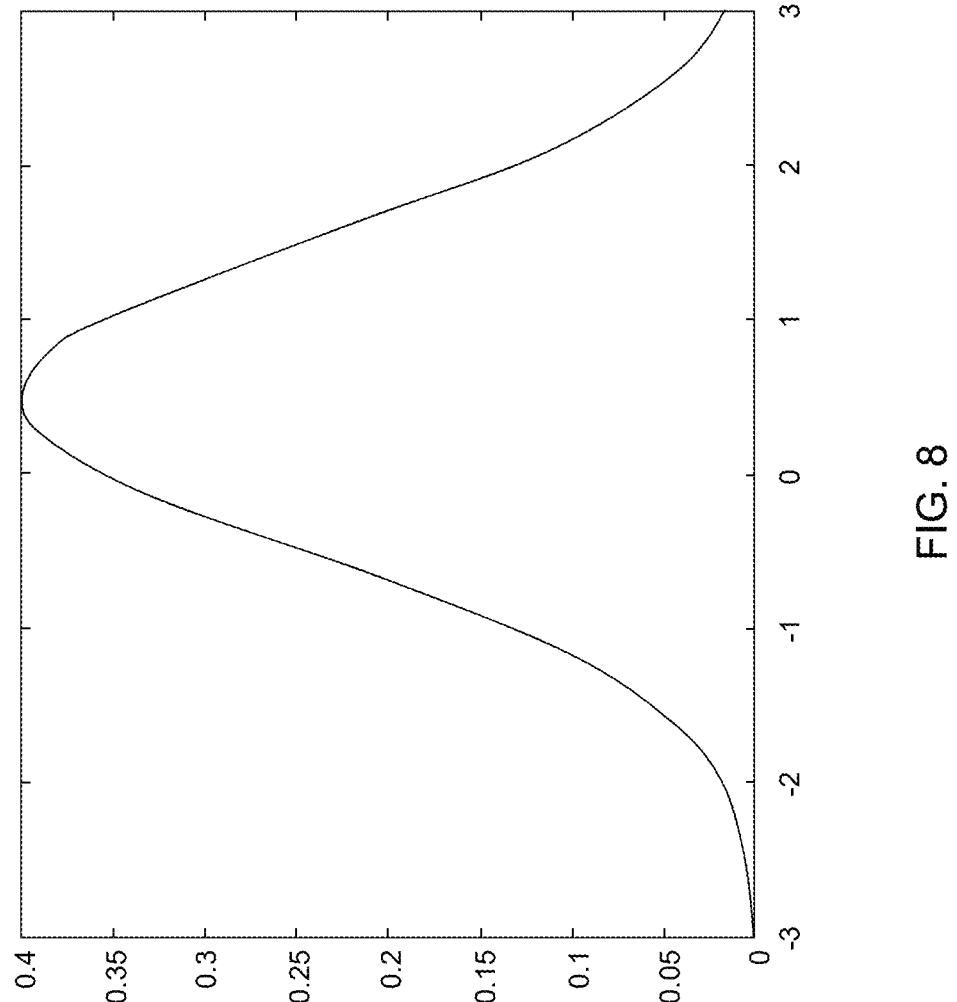
Figure 9:
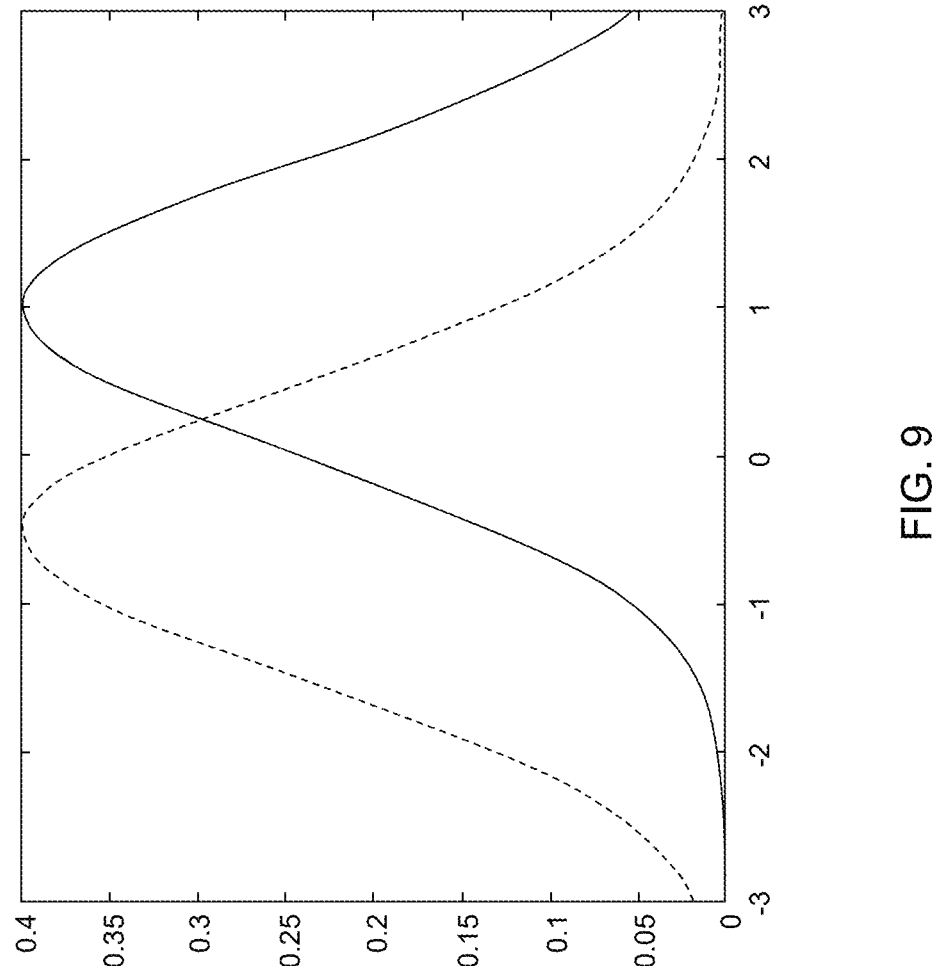
Figure 10:
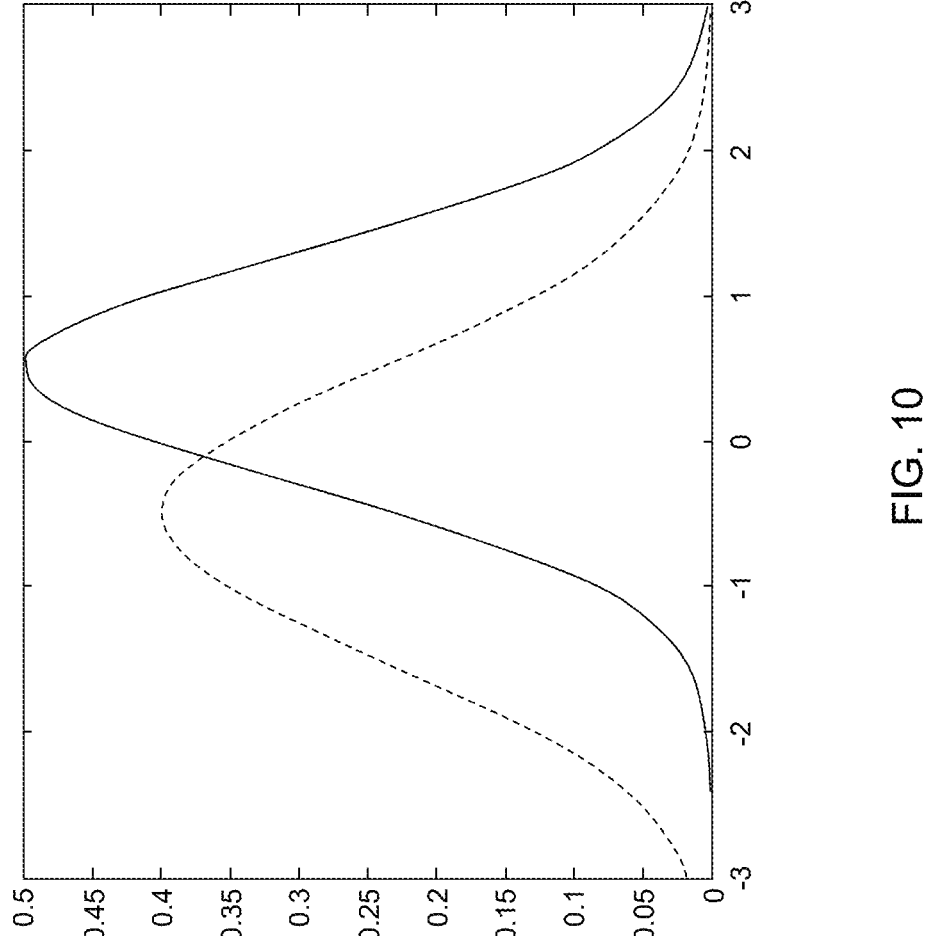
Figure 11:
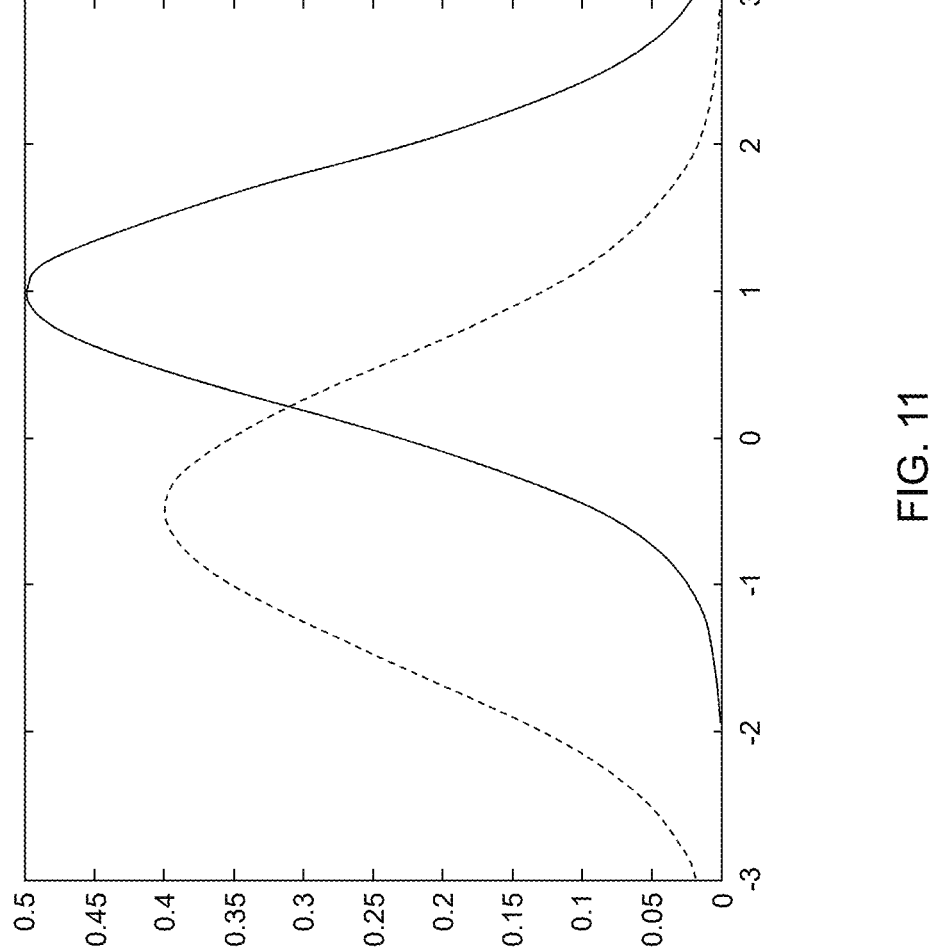

In one aspect of the present disclosure, the error source may be modeled as a symmetrical overbounding model (e.g., a Gaussian distribution), as illustrated in FIG. 4, where a mean of the distribution is defaulted as zero. As such, the characteristic parameter sent to improve the positioning integrity may only include a standard deviation of the distribution. In another aspect of the present disclosure, the error source may be modeled as a symmetrical paired overbounding model (e.g., two Gaussian distributions), as illustrated in FIG. 5, where the two distributions share a common mean and a common standard deviation. As such, the characteristic parameter sent to improve the positioning integrity may include the common mean and the common standard deviation. In yet another aspect of the present disclosure, the error source may be modeled as an asymmetrical paired overbounding model (e.g., a Gaussian distribution), as illustrated in FIG. 6, where a mean of the distribution is offset from zero. As such, the characteristic parameter sent to improve the positioning integrity may include the mean and a standard deviation of the distribution. In yet another aspect of the present disclosure, the error source may be modeled as an asymmetrical paired overbounding model (e.g., two Gaussian distributions), as illustrated in FIG. 7, where the two distributions have their respective means but share a common standard deviation. As such, the characteristic parameter sent to improve the positioning integrity may include the two means and the common standard deviation. In yet another aspect of the present disclosure, the error source may be modeled as an asymmetrical paired overbounding model (e.g., two Gaussian distributions), as illustrated in FIG. 8, where the two distributions have their respective standard deviations but share a common mean. As such, the characteristic parameter sent to improve the positioning integrity may include the two standard deviations and the common mean. In yet another aspect of the present disclosure, the error source may be modeled as an asymmetrical paired overbounding model (e.g., two Gaussian distributions), as illustrated in FIG. 9, where the two distributions have their respective standard deviations and respective means. As such, the characteristic parameter sent to improve the positioning integrity may include the two standard deviations and the two means. For the distribution of error sources or basic distribution Gaussian can be modeled as modeled as Gaussian distribution or other distribution having relation with Gaussian distribution, such as truncated Gaussian distribution or a table based on the distribution.

Embodiment 2

In various embodiments, the error source can be associated with one or more timing-related errors/measurements. In an example where the characteristic parameters (e.g., one or more means, and/or one or more standard deviations) modeling the error source are sent for an LMF-based positioning (e.g., measuring the PRS), the error source can include at least one of: a Reference Signal Time Difference (RSTD) measurement, a Relative Time of Arrival (RTOA) measurement, a UE Rx-Tx time difference measurement, a gNB Rx-TX time difference measurement, or an inter-TRP synchronization. Specifically, the RSTD measurement may be an error source for DL-TDOA, the RTOA measurement may be an error source for UL-TDOA, the UE Rx-Tx time difference measurement may be an error source for Multi-RTT, the gNB Rx-Tx time difference measurement may be an error source for Multi-RTT, and the inter-TRP synchronization may be an error source for UL-TDOA. In an example where the characteristic parameters (e.g., one or more means, and/or one or more standard deviations) modeling the error source are sent for a UE-based positioning (e.g., measuring the SRS), the error source can include an inter-TRP synchronization. Specifically, the inter-TRP synchronization may be an error source for DL-TDOA.

However, it should be understood that the error source may be associated with any of various other timing-related errors/measurements, while remaining within the scope of the present disclosure. Below is a list illustrating some examples of such other timing-related errors/measurements.

Timing-Related Error Source:

Sources of Error for Timing-Based Positioning Methods;

TRP/UE measurements errors (e.g., ToA, Rx-Tx timing difference);

Error in assistance data (e.g., TRP location, Inter-TRP synchronization errors (e.g., RTD));

TRP/UE Timing error;

RSTD measurement is an error source for DL-TDOA;

RTOA measurement is an error source for UL-TDOA;

UE Rx-Tx time difference measurement is an error source for Multi-RTT;

gNB Rx-Tx time difference measurement is an error source for Multi-RTT;

TEG-related timing error from timing related measurement error (e.g., RTOA, RSTD, UE/gNB Rx-Tx time difference);

the measurement error is considered for each ToA or for the reported RSTD value; and inter-TRP synchronization.

More Detail Grouped Error Sources:

The above timing-related error source in LOS case;

The above timing-related error source in NLOS case;

The above timing-related error source in LOS&NLOS case; and

The above timing-related error source in grouped scenario.

In various embodiments, the characteristic parameters (e.g., one or more means, and/or one or more standard deviations) can be associated with an Information Element (IE), "TimingQuality" or "MeasurementQuality." Specifically, the characteristic parameters can be defined through a plural number of measurements on the IE (TimingQuality/MeasurementQuality). For example, the IE NR-TimingQuality defines the quality of a timing measurement value for DL-TDOA and Multi-RTT measurement on the UE side, and the IE MeasurementQuality defines the quality of timing value for UL-TDOA and Multi-RTT measurement one the TRP side in terms of meter.

Further, these IEs are used to represent the deviation of the real distance from the estimation between a UE and a TRP. Basically, the candidate values of standard deviation of the error source model for integrity can be based on the candidate values of the above IEs, where the measurement uncertainty range is timingQualityValue*timingQualityResolution. Based on the uncertainty range timingQualityValue*timingQualityResolution, the standard deviation is (timingQualityValue*timingQualityResolution)/n, and the parameter n could be one, two, three and others values. Specially, when n is equal to one, the standard deviation is timingQualityValue*timing QualityResolution. And if n is equal to 3 which may be based on empirical, the standard deviation is (timingQualityValue*timingQualityResolution)/3.

If without thinking the unit/resolution timing QualityResolution in the formula, the standard deviation can be defined as follows:

(timingQualityValue)/n, and the parameter n could be one, two, three and others values. Specifically, when n is equal to one, the standard deviation is timingQualityValue. And if n is equal to 3 which may be based on empirical, the standard deviation is (timingQualityValue)/3.

For the maximum uncertainty values with different resolutions can be {3.1 m, 31 m, 310 m, 930 m}, i.e., 31*timingQualityResolution. Based on the uncertainty value range, the maximum standard deviation of the timing error source model may be presented as follows:

$$std_{max} = \text{round}\left(\frac{31}{n}\right)$$

For example, if based on empirical values, n is equal to 3. The standard deviation std could be one of the list {0, 1, 2, . . . 10}. Considering the resolution timing QualityResolution, the standard deviation std could be one of the list {0, 1, 2, . . . 10} *timingQualityResolution. And the max standard deviation could be (31/n)*timingQualityResolution. If n is 3, the max standard deviation is 10*timingQualityResolution. The character '*' means multiplication.

For another example, for the Inter-TRP synchronization error, all above schemes is suitable. Inter-TRP synchronization error is normal distribution.

$$Std \text{ value: } \{0, 1, 2, \ldots std_{max}\}, \text{ where}$$

$$std_{max} = \text{round}\left(\frac{31}{n}\right), \text{ and } n = 3 \text{ or other values}$$

$$\text{Resolution: } [mdot1, mdot5, m1, m5, m10, m20, m30, \ldots]$$

As mentioned above, the inter-TRP synchronization may be an error source for the UE-based positioning methods and for UE-assisted DL-TDOA method for LMF-based positioning integrity mode. For UE-based positioning methods, the IE NR-RTD-Info is used by the location server to provide time synchronization information between a reference TRP and a list of neighboring TRPs. Because the inter-TRP synchronization is signaled by higher layer parameter NR-RTD-Info as follows, and the error is reflected by the synchronization uncertainty, i.e. rtd-RefQuality or rtd-Quality, hence, the similar distribution for timing measurement error can be used. At least, Gaussian/normal distribution should be supported.

For another example, for the AdditionalPathList, which is used by the target device to provide information about additional paths in association to the TOA measurements associated to NR positioning in the form of a relative time difference and a quality value. The additional path nr-RelativeTimeDifference is the detected path timing relative to the detected path timing used for the TOA value, and each additional path can be associated with a quality value nr-PathQuality/NR-TimingQuality.

The parameter(s) of the distribution of the error source is related with the PathQuality. And the std parameter is as following:

$$Std \text{ value: } \{0, 1, 2, \ldots std_{max}\}, \text{ where}$$

$$std_{max} = \text{round}\left(\frac{31}{n}\right), \text{ and } n = 3 \text{ or other values}$$

$$\text{Resolution: } [mdot1, mdot5, m1, m5, m10, m20, m30, \ldots]$$

Embodiment 3

In various embodiments, the error source can be associated with one or more location-related errors/measurements. In an example, the error source includes a TRP or an ARP location. Specifically, the TRP/ARP location may be an error source for DL-TDOA/DL-AOD and UL-AOA positioning methods. In various embodiments, the characteristic parameters (e.g., one or more means, and/or one or more standard deviations) can be associated with an Information Element (IE), "LocationUncertainty," or its sub-IE, e.g., "horizontalUncertainty," "horizontalConfidence," "verticalUncertainty," and "verticalConfidence." Specifically, the characteristic parameters can be defined through a plural number of measurements on the IE (LocationUncertainty) or its sub-IE (horizontalUncertainty, horizontalConfidence, verticalUncertainty, and/or verticalConfidence).

The IE, LocationUncertainty, can be used to determine the characteristic parameters of the distribution for ARP/TRP location error integrity calculation. The TRP/ARP location may be an error source for DL-TDOA/DL-AOD and UL-AOA positioning methods. The TRP/ARP location indicates the coordinates of the transmission/antenna reference points for a set of TRPs. Since TRP/ARP location indicates the coordinates of the transmission/antenna reference points for a set of TRPs, that the TRP/ARP location error can be modeled as a normal distribution for the horizontal and the vertical domain, respectively. Alternatively, the model of TRP/ARP location error distribution can be modeled as a uniform distribution, where the range of uniform distribution is [0, horizontalUncertainty] and [0, verticalUncertainty] for horizontal and vertical domain, respectively.

In an example where the TRP/ARP location (the error source) is modeled as a Gaussian distribution, the characteristic parameters are related to the measurement result(s) of confidence and/or uncertainty. For example, the standard deviation of the Gaussian distribution is related to the measurement result(s) of confidence and/or uncertainty. If there is "no information" for confidence, the standard deviation is related with uncertainty. The confidence can be horizontalConfidence and/or verticalConfidence and/or a joint function horizontalConfidence and verticalConfidence. The uncertainty can be horizontalUncertainty and/or verticalUncertainty and/or a joint function horizontalUncertainty and verticalUncertainty.

Scheme 1: The characteristic parameter is the same level as the measurement/error.

For example, the std can computed from the existing LocationUncertainty reporting where it is either LMF reporting to UE for UE based positioning or TRP reporting to LMF. The extra signaling for TRP location error of positioning integrity is not needed.

Alternatively,

The parameter(s) std signaling for TRP location error of positioning integrity is needed.

For example, the association between the characteristic parameter and the IE (and/or its sub-IE) can be defined as follows:

$$\delta = \frac{1}{\sqrt{2}} \frac{a}{erf^{-1}(P)},$$

where $erf^{-1}(\cdot)$ is an inverse error function, P is a confidence value (including horizontalConfidence and/or verticalConfidence), a is an Uncertainty value (including horizontalUncertainty and/or verticalUncertainty).

Take the example of horizontal location, the reasoning process is following:

The a is horizontalUncertainty. The result of integral computation of f(x) should be equal to P, where P is a constant (Determine value) from horizontalConfidence. Hence, the following equations are satisfied.

$$\int_{-a}^{a} f(x)dx = \int_{-a}^{a} \frac{1}{\sqrt{2\pi}\,\delta} e^{-\frac{x^2}{2\delta^2}} dx = P,$$

$$\int_{0}^{a} \frac{1}{\sqrt{2\pi}\,\delta} e^{-\frac{x^2}{2\delta^2}} dx = 2P,$$

$$\left(1 + erf\left(\frac{x}{\delta\sqrt{2}}\right)\right)\Big|_{0}^{a} = 2P,$$

$$erf\left(\frac{a}{\delta\sqrt{2}}\right) = P,$$

$$\frac{a}{\delta\sqrt{2}} = erf^{-1}(P).$$

So the standard deviation $\delta$ is $$\delta = \frac{1}{\sqrt{2}} \frac{a}{erf^{-1}(P)},$$

where $erf^{-1}(\cdot)$ is the inverse error function.

For another example, the association between the characteristic parameter and the IE (and/or its sub-IE) can be defined as follows:

Std value: $\{0, 1, 2, \ldots std_{max}\}$, where $$std_{max} = round\left(\frac{255}{n}\right),$$

and n=3 or other values for the horizon domain and the vertical domain, respectively.

Scheme 2: The characteristic parameter is the higher level than the measurement/error. That means there are more than one measurement/error results for the IE of characteristic parameter(s).

For example, the association between the characteristic parameter and the IE (and/or its sub-IE) can be defined as follows: The error distribution parameters of TRP location is per TRP-LocationInfoElement IE in the NR-TRP-Location-Info Alternatively, The error distribution parameters of TRP location is per LocationInfoPerFreqLayer IE in the NR-TRP-LocationInfo Alternatively, The error distribution parameters of TRP location is per TRP-LocationInfo IE.

Alternatively,

The error distribution parameters of TRP location is higher level than TRP-LocationInfo IE.

The scheme 1 and/or scheme 2 can be also applied to other erroe sources. The specific signaling name could be different.

For example:

For the TRP/ARP location error distribution is modeled as normal distribution. The std can be calculated based on the existing parameter LocationUncertainty including uncertainty value and confidence value.

The std value $\delta$ should make $$\int_{-a}^{a} \frac{1}{\sqrt{2\pi}\,\delta} e^{-\frac{x^2}{2\delta^2}} dx = P, \text{ and } \delta = \frac{1}{\sqrt{2}} \frac{a}{erf^{-1}(P)},$$

where P is the mean (or other statistical method) of some confidence values, a is the mean (or other statistical method) of some Uncertainty values, and $erf^{-1}(\cdot)$ is the inverse error function.

Alternatively,

For example:

TRP ARP location error distribution is modeled as normal distribution. The std can be calculated based on the existing parameter Location Uncertainty including uncertainty value and confidence value.

One std value $\delta$ should make $$\int_{-a}^{a} \frac{1}{\sqrt{2\pi}\,\delta} e^{-\frac{x^2}{2\delta^2}} dx = P, \text{ and } \delta = \frac{1}{\sqrt{2}} \frac{a}{erf^{-1}(P)},$$

where P is the confidence value, a is the Uncertainty value, and $erf^{-1}(\cdot)$ is the inverse error function.

At last the (report) signaling std_last for overbounding model is based on at last one (/more than one) std value.

Such as the last signaling contain the std_last is the mean (or other statistical method) of a series of (or a group of) stds.

Embodiment 4

In various embodiments, In various embodiments, the error source can be associated with one or more angle-related errors/measurements. In an example, the error source includes at least one of: an Angle of Arrival (AoA) measurement, an AoA in Line-of-Sight (LCS), a Zenith Angle of Arrival (ZoA) in LCS, an AoA in Global Coordinate System (GCS), a ZoA in GCS, an AoA in LOS, an AoA in Non-Line-of-Sight (NLOS), or an AoA in LOS and NLOS. In various embodiments, the characteristic parameters (e.g., one or more means, and/or one or more standard deviations) can be associated with an Information Element (IE), "Angle Measurement Quality." Specifically, the characteristic parameters can be defined through a plural number of measurements on the IE (Angle Measurement Quality).

For example, the association between the characteristic parameter and the IE can be defined as follows. Candidate values of the standard deviation can be determined based on a value range of the IE, Angle Measurement Quality. A measurement uncertainty range is Azimuth Quality/Zenith Quality*Resolution, so the maximum uncertainty value is 255*Resolution. Accordingly, the maximum value of the standard deviation is defined as follows:

$$std_{max} = round\left(\frac{255}{n}\right),$$

and
the range of the standard deviation is defined as follows:
P Std value: $\{0, 1, 2, \ldots \text{std}_{max}\}$, where n=3, with
    Resolution: $\{0.1 \deg, \ldots\}$.

Embodiment 5

Considering whether the distribution parameters of the
UE measurement should be associated with each TRP (pair),
or with each measurement report. There are several methods
as following:
Case 1:
All RSTD measurements within a TRP pair (i.e., a same
NR-DL-TDOA-MeasElement LPP message) should be
associated with one set of error distribution parameters.
Error source of Rx-Tx time different measurement should
have the same principle with RSTD measurement that, all
the Rx-Tx time difference measurements within a TRP (i.e.,
a same NR-Multi-RTT-MeasElement LPP message) should
be associated with one set of error distribution parameters.
Similarly, all the DL-PRS RSRPP of the first path or the
DL-PRS RSRP for LMF-based DL-AoD within a TRP (i.e.,
a same NR-DL-AoD-MeasElement LPP message) should be
associated with one set of error distribution parameters.
Case 2:
All RSTD measurements containing in a same measure-
ment report (i.e., a same NR-DL-TDOA-ProvideLocation-
Information LPP message) should be associated with one set
of error distribution parameters. Error source of Rx-Tx time
different measurement should have the same principle with
RSTD measurement that, all Rx-Tx time difference mea-
surements containing in a same measurement report (i.e., a
same NR-Multi-RTT-ProvideLocationInformation LPP
message) should be associated with one set of error distri-
bution parameters. Similarly, all the DL-PRS RSRPP of the
first path or the DL-PRS RSRP for LMF-based DL-AoD
containing in a same measurement report (i.e., a same
NR-DL-AoD-ProvideLocationInformation LPP message)
should be associated with one set of error distribution
parameters.

Embodiment 6

For DL assistance data, TRP location is only for UE-based
positioning integrity mode (UE based DL-TDOA and UE
based DL-AoD), and inter-TRP synchronization is for UE-
based and LMF-based positioning integrity mode (UE based
DL-TDOA and LMF based DL-TDOA).
TRP location as an error source means the error of wrong
TRP location relative to the real TRP location obeys a
distribution. The TRP's location may not be stable when
time varies, for example at one time TRP location is at point
A, and at another time the TRP location is at point B (in
which point A and point B are very close), so its TRP
location shift (error) should form a distribution (a normal
distribution or uniform distribution) and this distribution
should be an attribute of the TRP.
TRP synchronization as an error source means the error of
wrong TRP synchronization relative to the real TRP syn-
chronization obeys a distribution. The synchronization
between two TRPs may not be stable when time varies, for
example at one time TRP synchronization value between
two TRPs is A, and at another time TRP synchronization
value between the same two TRPs is B (in which value A and
value B are very close), so its TRP synchronization shift (error) should form a distribution (a normal distribution or
uniform distribution) and this distribution should be an
attribute of the TRP pair.
Since they are both TRP-specific assistance data, the error
distribution parameters of these two error sources should be
configured per TRP in the DL assistance data, similar as
A-GNSS design which is per satellite per GNSS. To be
specific, the error distribution parameter of TRP location
should be configured per TRP-LocationInfoElement in the
NR-TRP-LocationInfo, and the error distribution parameter
of inter-TRP synchronization should be configured per Ref-
erenceTRP-RTD-Info in NR-RTD-Info.
Support to configure the error distribution parameters of
TRP location per TRP-LocationInfoElement IE in the NR-
TRP-LocationInfo.
Support to configure the error distribution parameters of
inter-TRP synchronization per ReferenceTRP-RTD-Info IE
in the NR-RTD-Info.

Embodiment 7

For UL/UL+DL positioning (UL-TDOA, UL-AoA and
multi-RTT), TRPs measure the SRS and perform measure-
ment result, then each gNB gathers TRPs measurements and
reports to LMF. There may be error sources existing at
TRP/gNB side, for example TRP measurement error. Thus,
NG-RAN nodes to report error distribution parameters for
TRP measurement error along with TRP measurement report
should be supported. As the agreement indicated above, the
error source of RTOA measurement, gNB Rx-Tx time
difference measurement and angle of arrival measurement
should have their corresponding error bound. Similar as DL
measurements, since each TRP only reports one measure-
ment for each measurement type, the error distribution
parameters of RTOA measurement, gNB Rx-Tx time differ-
ence measurement and angle of arrival should be associated
with multiple TRP's measurements, to be specific, associ-
ated with each MEASUREMENT RESPONSE message or
MEASUREMENT REPORT message.

Embodiment 8

TRP location is provided per TRP in NRPPa message;
ARP location is configured per TRP since one TRP can
associate multiple ARPs, and inter-TRP synchronization is
indicated as SFN Initialisation Time in the IE TRP infor-
mation. Similar to the DL assistance data, the error source of
ARP location and inter-TRP synchronization can have their
corresponding error distribution parameters, and the error
distribution parameters of these two error sources can be
configured per TRP information.

Embodiment 9

FIG. 12 illustrates a flow diagram of a method 1200 for
improving positioning with modeling one or more error
sources. The method 1200 may be implemented using any
one or more of the components and devices detailed herein
in conjunction with FIGS. 1-11 (e.g., FIG. 3). In overview,
the method 1200 may be performed by a core network entity
(e.g., LMF), in some embodiments. Additional, fewer, or
different operations may be performed in the method 1200
depending on the embodiment. At least one aspect of the
operations is directed to a system, method, apparatus, or a
computer-readable medium.
For example, the method 1200 can include sending, by a
core network entity to a first wireless communication entity, a message including measurement and/or assistance data for positioning, in which the assistance data includes no or one or more characteristic parameters associated with a model of an error source. The characteristic parameters can include one or more means and/or one or more standard deviations of a model of the error source, as discussed above. The error source can be associated with one or more timing-related errors/measurements, one or more location-related errors/measurements, or one or more angle-related errors/measurements. For example, the first wireless communication entity can be a UE. As such, the message may be sent concurrently with, or subsequently to a base station (e.g., TRP) sending another message to the LMF that includes various measurement results such as, for example, a measurement result on a UL reference signal for positioning (e.g., a Sounding Reference Signal).

FIG. 13 illustrates a flow diagram of a method 1300 for improving positioning with modeling one or more error sources. The method 1300 may be implemented using any one or more of the components and devices detailed herein in conjunction with FIGS. 1-11 (e.g., FIG. 4 or 5). In overview, the method 1300 may be performed by a core network entity (e.g., LMF), in some embodiments. Additional, fewer, or different operations may be performed in the method 1300 depending on the embodiment. At least one aspect of the operations is directed to a system, method, apparatus, or a computer-readable medium.

For example, the method 1300 can include receiving, by the LMF from a UE or a TRP, a message including assistance data for positioning, in which the assistance data includes one or more characteristic parameters associated with a model of an error source. The error source can be associated with one or more timing-related errors/measurements, one or more location-related errors/measurements, or one or more angle-related errors/measurements. In one aspect of the present disclosure, the message may be sent concurrently with, or subsequently to the LMF receiving another message from the UE that includes various measurement results such as, for example, a measurement result on a DL reference signal for positioning (e.g., a Positioning Reference Signal). In another aspect of the present disclosure, the message may be sent concurrently with, or subsequently to the LMF receiving another message from the TRP (or a gNB) that includes various measurement results such as, for example, a measurement result on a UL reference signal for positioning (e.g., a Sounding Reference Signal).

FIG. 14 illustrates a flow diagram of a method 1400 for improving positioning with modeling one or more error sources. The method 1400 may be implemented using any one or more of the components and devices detailed herein in conjunction with FIGS. 1-11. In overview, the method 1400 may be performed by a first wireless communication entity (e.g., UE or TRP), in some embodiments. Additional, fewer, or different operations may be performed in the method 1400 depending on the embodiment. At least one aspect of the operations is directed to a system, method, apparatus, or a computer-readable medium.

For example, the method 1400 can include sending, by a first wireless communication entity to a second wireless communication entity, a message including one or more characteristic parameters associated with a model of an error source. The characteristic parameters can include one or more means and/or one or more standard deviations of a model of the error source, as discussed above. The error source can be associated with one or more timing-related errors/measurements, one or more location-related errors/measurements, or one or more angle-related errors/measurements.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

What is claimed is:

1. A wireless communication method, comprising:
receiving, by a first wireless communication entity from a core network entity, a first message including assistance data for positioning, wherein the assistance data includes one or more characteristic parameters associated with a model of an error source,
wherein the error source is associated with one or more location-related error sources including at least one of a transmission reception point (TRP) location or an antenna reception point (ARP) location, and
wherein the error source is associated with a standard deviation having an integer value in a range from 0 to 31, and a resolution of m1, m10 or m30.

2. The wireless communication method of claim 1, wherein the model of the error source includes an overbounding model, and the one or more characteristic parameters include a standard deviation.

3. The wireless communication method of claim 1, wherein the error source is associated with one or more timing-related errors, and
wherein the error source includes an inter-TRP synchronization.

4. The wireless communication method of claim 1, wherein the error source is associated with a normal distribution.

5. A wireless communication method, comprising:
sending, by a core network entity to a first wireless communication entity, a first message including assistance data for positioning,
wherein the assistance data includes one or more characteristic parameters associated with a model of an error source,
wherein the error source is associated with one or more location-related error sources including at least one of a transmission reception point (TRP) location or an antenna reception point (ARP) location, and
wherein the error source is associated with a standard deviation having an integer value in a range from 0 to 31, and a resolution of m1, m10 or m30.

6. The wireless communication method of claim 5, wherein the model of the error source includes an overbounding model, and the one or more characteristic parameters include a standard deviation.

7. The wireless communication method of claim 5, further comprising:
identifying, by the core network entity, the error source associated with one or more timing-related errors,
wherein the error source includes an inter-TRP synchronization.

8. The wireless communication method of claim 5, wherein the error source is associated with a normal distribution.

9. A first wireless communication entity, comprising:
a receiver configured to receive, from a core network entity, a first message including assistance data for positioning,
wherein the assistance data includes one or more characteristic parameters associated with a model of an error source,
wherein the error source is associated with one or more location-related error sources including at least one of a transmission reception point (TRP) location or an antenna reception point (ARP) location, and
wherein the error source is associated with a standard deviation having an integer value in a range from 0 to 31, and a resolution of m1, m10 or m30.

10. The first wireless communication entity of claim 9, wherein the model of the error source includes an overbounding model, and the one or more characteristic parameters include a standard deviation.

11. The first wireless communication entity of claim 9, wherein the error source is associated with a normal distribution.

12. The first wireless communication entity of claim 9, wherein the error source is associated with one or more timing-related errors, and wherein the error source includes an inter-TRP synchronization.

13. A core network entity, comprising:

a transmitter configured to send, to a first wireless communication entity, a first message including assistance data for positioning, wherein the assistance data includes one or more characteristic parameters associated with a model of an error source, wherein the error source is associated with one or more location-related error sources including at least one of a transmission reception point (TRP) location or an antenna reception point (ARP) location, and wherein the error source is associated with a standard deviation having an integer value in a range from 0 to 31, and a resolution of m1, m10 or m30.

14. The core network entity of claim 13, wherein the model of the error source includes an overbounding model, and the one or more characteristic parameters include a standard deviation.

15. The core network entity of claim 13, further comprising:

at least one processor configured to identify the error source associated with one or more timing-related errors, wherein the error source includes an inter-TRP synchronization.

16. The core network entity of claim 13, wherein the error source is associated with a normal distribution.

\* \* \* \* \*